United States Patent
Schmidt et al.

(10) Patent No.: US 10,567,511 B2
(45) Date of Patent: Feb. 18, 2020

(54) METHOD AND SYSTEM FOR MANAGING ENCRYPTED DATA OF DEVICES

(71) Applicant: NEC Europe Ltd., Heidelberg (DE)

(72) Inventors: Mischa Schmidt, Heidelberg (DE); Jens-Matthias Bohli, Leimen (DE)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 15/546,668

(22) PCT Filed: Jan. 30, 2015

(86) PCT No.: PCT/EP2015/052006
§ 371 (c)(1),
(2) Date: Jul. 27, 2017

(87) PCT Pub. No.: WO2016/119900
PCT Pub. Date: Aug. 4, 2016

(65) Prior Publication Data
US 2018/0013830 A1    Jan. 11, 2018

(51) Int. Cl.
*H04L 29/08* (2006.01)
*H04W 12/04* (2009.01)
(Continued)

(52) U.S. Cl.
CPC .............. *H04L 67/12* (2013.01); *H04L 67/10* (2013.01); *H04L 67/2809* (2013.01);
(Continued)

(58) Field of Classification Search
CPC ............... H04L 67/12; H04L 29/06707; H04L 29/06721; H04L 29/06727; H04L 29/0666; H04L 29/0668; H04L 67/10; H04L 67/2809; H04W 4/70; H04W 12/04; H04W 12/0401; H04W 12/04031; H04W 12/02; H04W 12/00502
See application file for complete search history.

(56) References Cited

U.S. PATENT DOCUMENTS

| 8,977,741 | B1 * | 3/2015 | Fredinburg | G06F 9/5061 |
| | | | | 709/224 |
| 9,374,221 | B1 * | 6/2016 | Juels | H04L 9/321 |

(Continued)

FOREIGN PATENT DOCUMENTS

| EP | 2216731 A2 | 8/2010 | | |
| EP | 2424156 A1 * | 2/2012 | | H04L 9/0861 |

(Continued)

*Primary Examiner* — Patrice L Winder
*Assistant Examiner* — Aye M Aung
(74) *Attorney, Agent, or Firm* — Leydig, Voit & Mayer, Ltd.

(57) ABSTRACT

A method for managing data of devices using one or more computing entities includes encrypting, by one or more encrypting entities, the data based on encryption policies using encryption keys; storing the encrypted data as ciphertext at a storing entity; requesting decryption keys to decrypt the stored ciphertext by one or more clients; computing restricted decryption keys based on access right policies for the requesting clients by a security management entity; and providing the generated decryption keys to the requesting clients for decrypting the stored ciphertext.

14 Claims, 3 Drawing Sheets

(51) Int. Cl.
*H04W 4/70* (2018.01)
*H04W 12/02* (2009.01)
*H04W 12/00* (2009.01)

(52) U.S. Cl.
CPC ............. *H04W 4/70* (2018.02); *H04W 12/04* (2013.01); *H04W 12/00502* (2019.01); *H04W 12/02* (2013.01)

(56) References Cited

U.S. PATENT DOCUMENTS

| | | | |
|---|---|---|---|
| 2010/0002880 A1* | 1/2010 | Yoon | H04L 12/66 380/255 |
| 2011/0141967 A1 | 6/2011 | Lane et al. | |
| 2011/0237234 A1 | 9/2011 | Kotani et al. | |
| 2013/0246726 A1* | 9/2013 | Kirstenpfad | G06F 16/10 711/162 |
| 2014/0105390 A1* | 4/2014 | Chen | G06F 21/602 380/200 |
| 2015/0264052 A1* | 9/2015 | Cho | H04L 63/0428 713/176 |
| 2016/0034699 A1* | 2/2016 | Sasaki | G06F 21/6218 726/27 |
| 2016/0156462 A1* | 6/2016 | Winslow | H04L 9/083 380/279 |
| 2016/0188894 A1* | 6/2016 | Factor | G06F 21/6218 713/165 |
| 2016/0381011 A1* | 12/2016 | Mu | H04L 63/0853 713/169 |
| 2017/0242961 A1* | 8/2017 | Shukla | G06F 21/32 |

FOREIGN PATENT DOCUMENTS

| | | |
|---|---|---|
| EP | 2424156 A1 | 2/2012 |
| WO | WO 2014148960 A1 | 9/2014 |

* cited by examiner

METHOD AND SYSTEM FOR MANAGING ENCRYPTED DATA OF DEVICES

CROSS REFERENCE TO RELATED APPLICATIONS

This application is a U.S. National Stage Application under 35 U.S.C. § 371 of International Application No. PCT/EP2015/052006 filed on Jan. 30, 2015. The International Application was published in English on Aug. 4, 2016 as WO 2016/119900 A1 under PCT Article 21(2).

FIELD

The present invention relates to a method for managing encrypted data of devices, preferably M2M devices like sensors in buildings, using one or more computing entities. The present invention further relates to a system for managing encrypted data of devices, preferably M2M devices like sensors in buildings. The present invention even further relates to a security management entity.

BACKGROUND

Building management systems monitor and control several systems in a building such as heating, air-condition, lighting, mechanical systems and various other kinds of alarms. To be able to manage the building in an automatic way the building management system collects data from many sensors installed throughout the building.

Conventional building management systems make in general use of the "cloud" for storage, where management services can be booked on demand. Therefore conventionally building data is kept outside the building and even outside the building management organization at a cloud storage or cloud service providers.

However, this causes several problems, in particular security and privacy problems: When the data is collected this data is strongly correlated with actions of persons leading to severe privacy issues in residential buildings. Also in office environments data which is collected from the sensors in the building may reveal personal preferences and habits of employees. Even further the collected data may allow deriving confidential information of a company, for example the work load of groups and departments.

Further a security problem arises when the data is initially collected as a whole and later a focus on the relevant subset of the data is set being a source of threats, in particular when considering outsourcing of data analysis to third parties.

SUMMARY

In an embodiment, the present invention provides a method for managing data of devices using one or more computing entities. The method includes encrypting, by one or more encrypting entities, the data based on encryption policies using encryption keys; storing the encrypted data as ciphertext at a storing entity; requesting decryption keys to decrypt the stored ciphertext by one or more clients; computing restricted decryption keys based on access right policies for the requesting clients by a security management entity; and providing the decryption keys to the requesting clients for decrypting the stored ciphertext.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
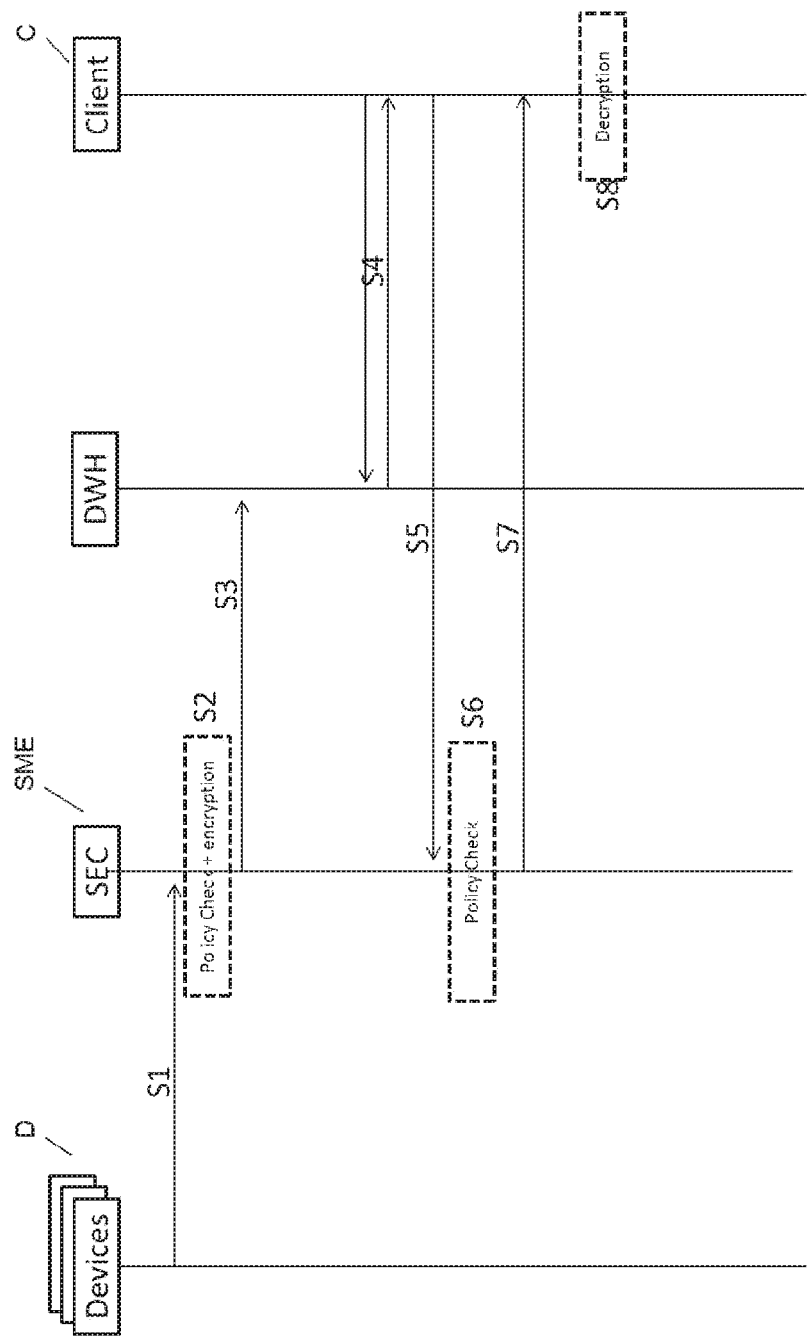
FIG. 1 shows a part of a method according to a first embodiment of the present invention.

A method and a system are described herein for managing encrypted data of devices providing a high level of security while being flexible and easy to implement.

Although applicable to data in general the present invention will be described with regard to data of M2M devices, in particular data of building management systems.

A method for managing encrypted data of devices, preferably M2M devices like sensors in buildings, using one of more computing entities is described herein.

A method according to an embodiment of the invention includes the steps of a) Encrypting said data based on encryption policies using encryption keys by one or more encrypting entities, b) Storing the encrypted data—ciphertext—at a storing entity, c) Requesting decryption keys to decrypt the stored ciphertext by one or more of said clients, d) Computing restricted decryption keys based on said access right policies for said requesting clients by a security management entity—SME—and e) Providing the generated decryption keys to said requesting clients for decrypting said stored ciphertext.

A system for managing encrypted data of devices, preferably M2M devices like sensors in buildings, is described herein.

A system according to an embodiment of the invention includes a security management entity—SME—adapted to compute restricted decryption keys based on access right policies for requesting clients and to provide the generated decryption keys for decrypting said stored ciphertext, one or more encrypting entities adapted to encrypt said data based on encryption policies using encryption keys, a storing entity, preferably a cloud, adapted to store the encrypted data—ciphertext—, one or more of said clients adapted to request decryption keys from said SME to decrypt the stored ciphertext.

A security management entity for performing a method is described herein.

A security management entity according to an embodiment of the invention is adapted to compute restricted decryption keys based on access right policies for requesting clients and to provide the computed decryption keys for decrypting ciphertext encrypted with one or more encryption policies.

The term "entity" can be understood in its broadest sense. In particular an "entity" may be any kind of device, preferably computing device or the like, or a plurality of devices interacting with each other, e.g. for example a storing entity may be a plurality of servers able to store data and interacting with each other to provide said storing.

The terms "clients", "keys", "ciphertext" and "policies" with regard to encryption and decryption may also be understood as only one client, one key, a plurality of ciphertexts or one policy.

Security can be enhanced by embodiments of the present invention since data owners stay in control while the data itself may be stored externally. In particular off-the-shelf cloud storage services can be used for sensitive data while maintaining strong technical data protection.

Flexibility can also be enhanced by embodiments of the present invention since flexible and dynamic policies and interchangeable methods for data protection can be used depending on the needs of a user, a company or the like.

Complex access policies can be realized by embodiments of the present invention and thus flexibility can further be enhanced for example in business relations as third parties can be granted and revoked access to the encrypted data "on-the-fly".

Embodiments of the present invention provide a security management entity—which is in the following also called "security broker"—preferably enabling a management of encryption policies and schemes as well as encryption keys in such a way that decryption keys for decrypting partial information of the encrypted data can be generated in a flexible way. For instance the full data of the building can then be transmitted to cloud-based systems in encrypted form and a client can request decryption keys for accessing the information needed from the security broker to decrypt the data. The security broker provides for example sensors and/or encryption entities encryption keys for encrypting the data that besides conventional encryption techniques, in particular makes it possible to generate decryption keys that decrypt only partial data.

According to a preferred embodiment the SME acts itself as said one or more encrypting entities. This has the advantage that the security broker not only provides the encryption keys but also encrypts the data, so that a time and resource consuming transmission to other encrypting entities is avoided.

According to a further preferred embodiment prior to encryption an encryption context of the data is determined, included into said encryption policies and used for encryption of the data. This is flexible since any context or context information can be used as encryption context and included when encrypting said data enabling context-based encryption. The number of context states per device is preferably flexible and may be expressed by a simple logic, for example comparing a message comprising the data to be encrypted with reference values or value ranges. To summarize this greatly enhances the flexibility.

According to a further preferred embodiment time information and/or range information is collected and included in said encryption context. For example for a time-based encryption said time information is determined indicating a time T. Range information can be used for range-based encryption: Value ranges for the value to be encrypted can be specified and translated into the encryption keys. Alternatively different value ranges for different devices can be specified. The term "ciphertext" is to be understood in its broadest sense as encrypted data in the description, in particular in the claims. Further the term "ciphertext" may be understood in plural, i.e. for example when different time durations are specified this may result in multiple associated ciphertexts for a single message comprising the data to be encrypted.

According to a further preferred embodiment meta-data is associated to and stored with said data at said storing entity. Meta-data enable clients to efficiently request decryption keys, etc. using the additional meta-data to specify their requests.

According to a further preferred embodiment identification and/or contact information of the SME is included into the meta-data. This enables clients to identify and contact the responsible security broker or security management entity respectively and request decryption keys to decrypt corresponding data. The meta-data comprises for example a URL to reach the responsible security broker via the clients.

According to a further preferred embodiment information representing at least one of the following: identification of devices, timestamps, tokens computed by the SME, is included into the meta-data. This information enables clients to specify their interest in data to be decrypted even more precisely and the security broker or SME respectively may then quickly decide whether to grant or deny their requests and generate the appropriate responses. Preferably no confidential information is disclosed within the meta-data.

According to a further preferred embodiment the encryption policies and/or access right policies are requested from the SME by one or more of said encrypting entities. This enables the encrypting entities to request configuration and parameters like encryption policies and access right policies from the security broker at the time needed. This may be performed via an appropriate conventional protocol suitable for exchanging this information.

According to a further preferred embodiment when requesting decryption keys a client specifies his interest in the decryption keys using information to be compared by the SME with stored access right policies and preferably of meta-data associated with the requested data of said client. This enables to efficiently request data: The SME can answer the request by limiting the number of decryption keys using the information transmitted by the client to be compared with the policies and meta-data associated to the data and the client. Data transmission between a client and the security broker can be performed via for example URL through various conventional protocols who—depending on the configured access right policies—may or may not respond with decryption keys for deciphering the ciphertext(s). A current interest of the client may for example be only data encrypted in the last hour or the like. Comparison between the data provided by the client and requesting the decryption keys and the policies associated to the client is only successful when the information provided by the client is an eligible subset of the policies associated to the client.

According to a further preferred embodiment one or more master encryption keys are generated and used for generating said encryption keys. A master key may be provided by the security broker or may be configured into the security broker. A master key allows for example encrypting entities to derive appropriate decryption keys from said master encryption key, i.e. the master key provides in a flexible while secure way the generation of encryption keys.

According to a further preferred embodiment one or more chains, preferably hash chains are computed and used as encryption keys and/or decryption keys. This enables in an easy way to derive the encryption and decryption keys including also time or data ranges for example.

According to a further preferred embodiment one or more of said clients query the SME for supported access right and/or encryption policies prior to step e). This enables clients to be aware of the policies supported by the security broker or SME respectively so that the client can specify his interest in context of these policies. Thus, efficient requests by the client can be performed. Preferably either the clients can be preconfigured or use an appropriate protocol to query the security broker or SME respectively for the supported policies.

According to a further preferred embodiment the encrypting entities request the master encryption keys from said SME and compute themselves the encryption keys for encrypting said data. This enables in a very flexible way a generation/computation of the encryption keys by the entities encrypting the data.

According to a further preferred embodiment prior to encrypting data access right policies, encryption policies and/or further parameters for the different encryption schemes are configured into the SME, for example a master encryption key, eligible client identifications and/or access right policies, device identifications and the encryption policies and/or parameters for setting up encryption schemes like definition of epochs, relevant context information of other devices like sensors or the like, description of ranges of expected measurements of the data provided by the devices or the like. This enables a security broker or SME respectively to efficiently manage the encrypted data.

According to a further preferred embodiment the SME acts a policy decision entity enforcing policies associated to a requesting client when releasing decryption keys for the data in the domain of the SME/security broker.

According to a further preferred embodiment steps d) and e) are shielded from the SME by the storing entity. This enables that the storing entity acts on behalf of the client seen from the SME and requests decryption keys from the SME and provides later the decryption keys to the requesting client on behalf of the SME. This simplifies the client since the client only needs to communicate with the storing entity.

FIG. 1 shows a part of the steps of a method according to a first embodiment of the present invention.

In FIG. 1 an example for a call flow is depicted. An aforementioned configuration, e.g. based on CAMPUS21 or BaaS architectures for this phase is not depicted. Further the security broker/security entity SEC denoted with reference sign SME is assumed to be already configured.

In step S1 different devices D, for example sensors, deliver data for example in a message m to the SEC/SME. Based on its configuration the SEC/SME checks the corresponding encryption policy and performs encryption of each message m into one or more ciphertexts c in a step S2. The security broker/security entity SEC acts here in this embodiment as encryption entity.

The SEC/SME then delivers the various ciphertexts c in a step S3 to a data repository, denoted with reference sign DWH along with meta-data. The data repository DHW may or may not confirm data storage to the SEC/SME.

In a further step S4 a client C requests data from the data repository DWH and receives a set of ciphertexts c along with the associated meta-data.

In a fifth step S5, the client C then contacts the SEC/SME to request decryption keys for the received ciphertexts c, preferably additionally specifying interest in deciphering entries for the last hour.

In a sixth step S6 the SEC/SME checks the client's request against configured policies and responds in a seventh step S7 with a set of decryption keys to the client C.

Only then the client C can decipher the data in an eighth step S8 or a subset of the data.

In a preferred embodiment the data repository DWH acts on the client's behalf and requests the decryption keys from the SEC/SME. This simplifies actions to be taken by the client but complicates the implementation of the storing entity DWH and places a certain trust into the storing entity DWH again. The storing entity DWH is then able to store and decrypt the data.

Figure 2:
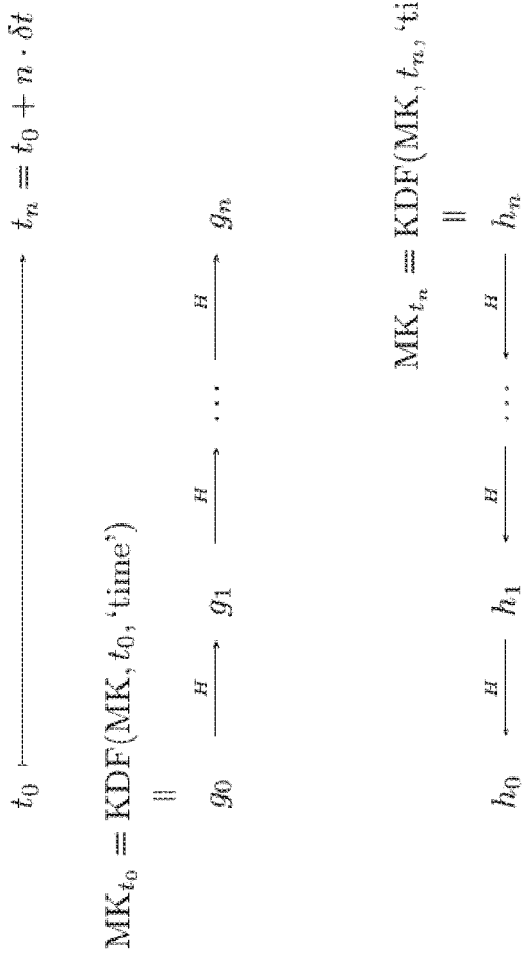
FIG. 2 shows a part of a method according to a second embodiment of the present invention.

FIG. 2 shows a part of a method according to a second embodiment of the present invention.

In FIG. 2 the generation of hash chains g and h given the master key MK and an epoch from $t_0$ to $t_n$ is shown for providing a time-based encryption.

In more detail the data collector encrypts a message dependent of the current time t. An epoch $e=[t_0, \ldots, t_n]$ is defined and within the epoch e it is possible to create a decryption key $k_T$ for any time interval $T=[t_j, \ldots, t_{j+k}] \subseteq e$, such that $k_T$ can exactly decrypt only the ciphertexts c that were created at a time $t \in T$. Practically, an epoch might be one day, but could also be longer or shorter. As only one interval key per epoch e can be created, the price for the flexibility in requesting multiple intervals that comes with short epochs is the additional key overhead.

The following procedures, also called protocols, are used for setting up an encryption scheme, to encrypt data and to decrypt the data later:

Setup. To setup the scheme, an epoch e is defined, given by it's start date $t_0$, a time period $\delta t$ and a length $n \in \mathbb{Z}$. The end time of the epoch is then given as $t_n = t_0 + n \cdot \delta t$. Given the master key MK, two keys for the scheme are derived, denoted by $MK_{t_0} = KDF(MK, t_0, \text{'time'})$ and $MK_{t_n} = KDF(MK, t_n, \text{'time'})$. Two hash chains of length n are computed. The elements are computed as follows:

$g_i = H^i(MK_{t_0})$ and $h_{n-i} = H^i(MK_{t_n})$ for $i=0, \ldots, n$, where $H^i(\cdot)$ denotes the i-fold application of the hash function H, thus the first elements are given as $g_0 = MK_{t_0}$ and $h_n = MK_{t_n}$.

For each $t_i \in e$, the encryption key is set as $k_i = g_i \oplus h_i$. A decryption key is given by $k_T = (g_i, h_j)$ with $i \leq j$, which provides the ability to decrypt ciphertexts in the interval $T = [t_i, \ldots, t_j]$.

Encrypt. Given the key MK, the value m is at time t encrypted as $E_{MK}^{t_i}(m) = E_{k_i}(m)$.

Decrypt. Given the ciphertext c from time $t_c$, a key $k_T = (g_i, h_j)$ is needed, with $i \leq c \leq j$. From $g_i$ and $h_j$, it is possible to compute $g_c$ and $h_c$, by completing the hash chain as described in the setup protocol. With the key $k_c = g_c \oplus h_c$ it is possible to decrypt the ciphertext c to obtain m.

$D_{k_T}^{t_c}(c) E_{k_c}(c)$.

Another encryption scheme may be provided when the encryption is based on context variables. This encryption mode ties the encrypted message c to context variables at the time of encryption. Unlike the aforementioned time-based encryption and a further described encryption below based on a range the following encryption scheme does not imply any order in the set of possible contexts.

In more detail the context is given by a set Y and the following procedures are used for setting up a context-based encryption scheme, to encrypt data and to decrypt the data later:

Setup. Given is finite set $\mathbb{Y}$. For each element $y \in \mathbb{Y}$, a key $k_y$ is computed by $k_y = KDF(MK, y) \forall y \in \mathbb{Y}$.

Encrypt. When an element $m \in \mathbb{X}$ is to be encrypted, the context y is queried. Then $k_y$ is used to encrypt the message as $E_{MK}^y(m) = E_{k_y}(m)$.

Decrypt. Given a ciphertext $c^y=E_{k_y}(m)$ with context y, and the key $k_y$, the message can simply be obtained by $m=D_{k_y}(m)$.

An even further encryption scheme is based on ranges. This embodiment builds on the same principles as time-based encryption but instead of time the encryption and decryption keys are computed depending on the data to be encrypted itself. The purpose is to release partial data based on the encrypted values, e.g. to release only outliers. The plaintext space is modeled as a totally ordered finite set X, typically a discrete numerical scale. Let n denote the size of X and $m0, \ldots, mn-1$ the elements of X in ascending order. The encryption offers the possibility to produce a key pair $k_{in}$, $k_{out}$ for an interval $[a, b] \subseteq X$. The keys have the property, that $k_{in}$ only decrypts the ciphertexts where $c=E(m)$ and $m \in [a, b]$. In addition, the encryption procedure offers the possibility to decrypt the outliers only by releasing only $k_{out}$, i.e. $k_{out}$ only decrypts $c=E(m)$ for $m \notin [a, b]$.

Figure 3:
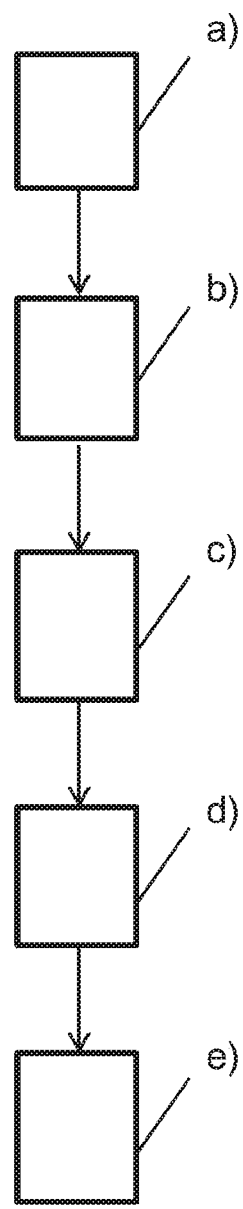
FIG. 3 shows steps of a method according to a third embodiment of the present invention.

FIG. 3 shows steps of a method according to a third embodiment of the present invention.

In a first step a) said data is encrypted based on encryption policies using encryption keys by one or more encrypting entities.

In a second step b) the encrypted data—ciphertext—is stored at a storing entity.

In a third step c) decryption keys are requested to decrypt the stored ciphertext by one or more of said clients, In a forth step d) restricted decryption keys are computed based on said access right policies for said requesting clients by a security management entity—SME—.

In a fifth step e) the generated decryption keys to said requesting clients for decrypting said stored ciphertext.

In summary embodiments of the present invention may provide, inter alia, the following advantages:

Off-the-shelf cloud storage services can be used for sensitive data while maintaining strong technical data protection.

Flexible and dynamic policies and exchangeable methods for data protection can be "plugged" in depending on the needs of the deployment scenario.

Data owner stays in control while data itself is stored externally.

Only few master keys need to be stored, due to use of hash-chains to realize e.g. range and time based encryption.

Complex access policies can be realized by combining the different approaches, i.e. encryption schemes.

Provides flexibility in business-relations as 3rd parties can be granted and revoked access to the data "on-the-fly".

Embodiments of the present invention can enable derivation of a chain, e.g. a hash chain, with the elements representing a time range or a data range and use of the elements as encryption and decryption keys.

Embodiments of the present invention further enable use of two chains representing a time or data range, one starting from the minimal value going up, one starting from the maximum value going down. Combining the elements of each of the chains enables to compute encryption and decryption keys. Further a device is presented that negotiates and manages security associations specific to requests typically occurring in an M2M system.

In particular, a method according to an embodiment of the present invention includes the following steps of:

1) Encrypting gateway or sensor data according to an encryption policy and keys from the security broker,
2) Encrypted data is sent to an outsourced database,
3) Building management system has access to encrypted data and requests from security broker the decryption keys to access required data.
4) The security broker generates suitably restricted decryption keys, e.g.
   a. Only access during certain time period
   b. Only access based on context, e.g. only measurements in empty rooms
   c. Only access to outliers.
5) Building management system decrypts the data and provides its service.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing data of devices using one or more computing entities, the method comprising:
   computing a first key based on a master key and a second key based on the master key,
   computing a first hash chain of keys using the first key and a second hash chain of keys using the second key,
   generating a plurality of encryption keys using an exclusive or of the first hash chain of keys and the second hash chain of keys,
   encrypting, by one or more encrypting entities, the data based on encryption policies using the plurality of encryption keys,
   storing the encrypted data as ciphertext,
   receiving a request for decryption keys to decrypt the stored ciphertext by one or more clients,
   requesting the decryption keys from a security management entity, wherein the security management entity computes the two restricted decryption keys based on access right policies for the requesting clients and the two hash chains of keys,
   providing the two restricted decryption keys to the requesting clients for decrypting the stored ciphertext, and
   wherein the two restricted decryption keys enable the requesting clients to calculate keys for decrypting the ciphertext by generating a hash chain for each of the two restricted decryption keys and using an exclusive or on pairs of entries of the hash chains created from the two restricted decryption keys.

2. The method according to claim 1, wherein the security management entity acts itself as the one or more encrypting entities.

3. The method according to claim 1, wherein prior to encryption an encryption context of the data is determined and used for encryption of the data.

4. The method according to claim 3, wherein time information and/or range information is collected and included in the encryption.

5. The method according to claim 1, wherein meta-data is associated to and stored with the data of a storing entity.

6. The method according to claim 5, wherein identification and/or contact information of the security management entity is included into the meta-data.

7. The method according to claim 5, wherein information is included into the meta-data that represents at least one of the following: identification of devices, timestamp, tokens computed by the security management entity.

8. The method according to claim 1, wherein the encryption policies and/or access right policies are requested from the security management entity by one or more of the encrypting entities.

9. The method according to claim 1, wherein when requesting decryption keys, a client specifies interest in the decryption keys using information to be compared by the security management entity with stored access right policies and meta-data associated with the requested data of the client.

10. The method according to claim 1, wherein one or more master encryption keys are generated and used for generating the encryption keys.

11. The method according to claim 1, wherein one or more of the clients query the security management entity for supported access right and/or encryption policies.

12. The method according to claim 1, wherein the encrypting entities request the master encryption keys from the security management entity and compute themselves the encryption keys for encrypting the data.

13. A system for managing data of devices comprising one or more processors which, alone or in combination, are configured to provide for performance of the following steps:
   computing a first key based on a master key and a second key based on the master key,
   computing a first hash chain of keys using the first key and a second hash chain of keys using the second key,
   generating a plurality of encryption keys using an exclusive or of the first hash chain of keys and the second hash chain of keys,
   encrypting the data based on encryption policies using the plurality of encryption keys,
   storing the encrypted data as ciphertext,
   receiving a request for decryption keys to decrypt the stored ciphertext by one or more clients,
   requesting the decryption keys from a security management entity, wherein the security management entity computes the two restricted decryption keys based on access right policies for the requesting clients and the two hash chains of keys,
   providing the two restricted decryption keys to the requesting clients for decrypting the stored ciphertext, and
   wherein the two restricted decryption keys enable the requesting clients to calculate keys for decrypting the ciphertext by generating a hash chain for each of the two restricted decryption keys and using an exclusive or on pairs of entries of the hash chains created from the two restricted decryption keys.

14. The system according to claim 13, wherein the security management entity computes the two provides the two computed decryption keys for decrypting ciphertext encrypted with one or more of encryption policies to the system for managing data.

* * * * *